United States Patent Office 3,313,971
Patented Apr. 11, 1967

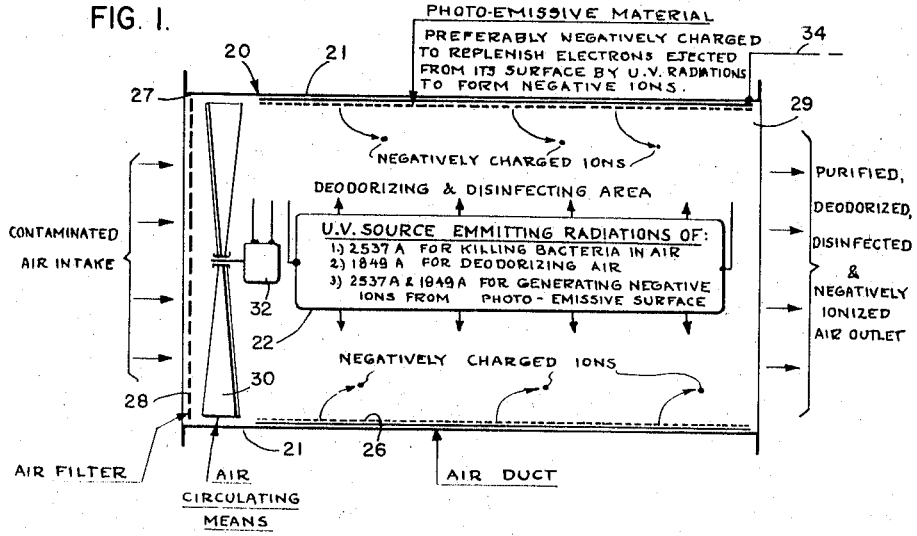
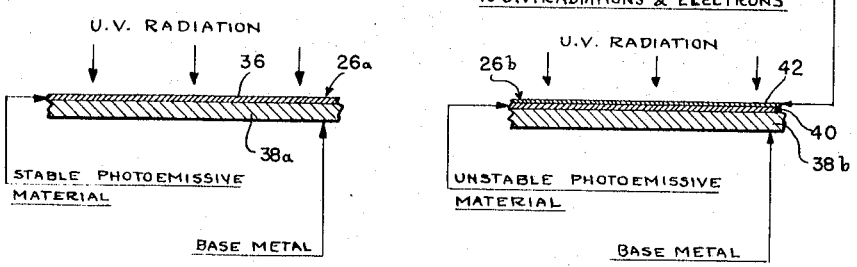
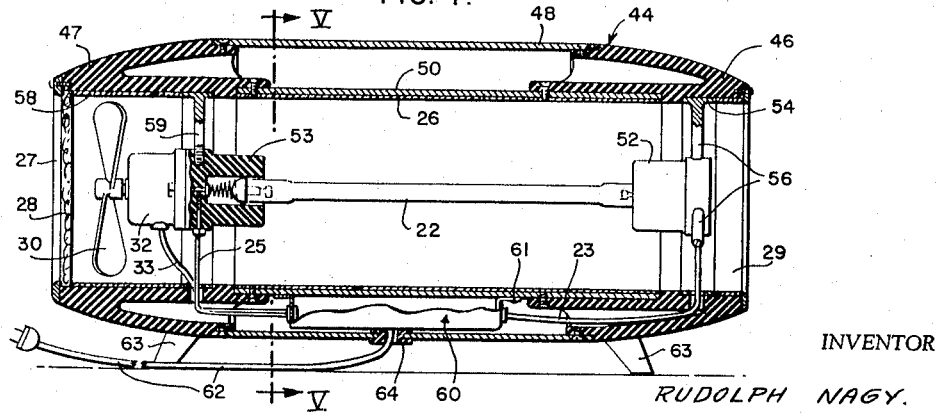

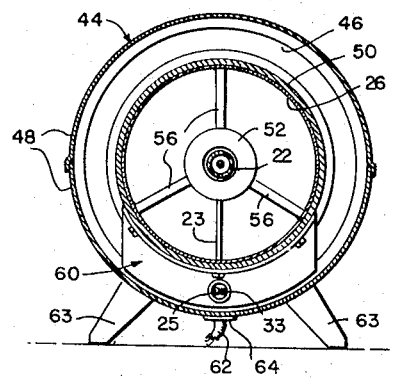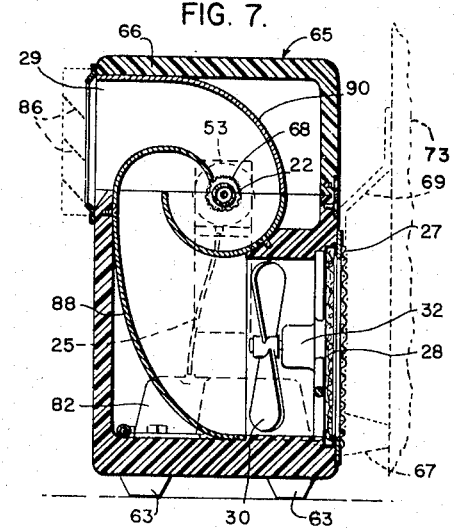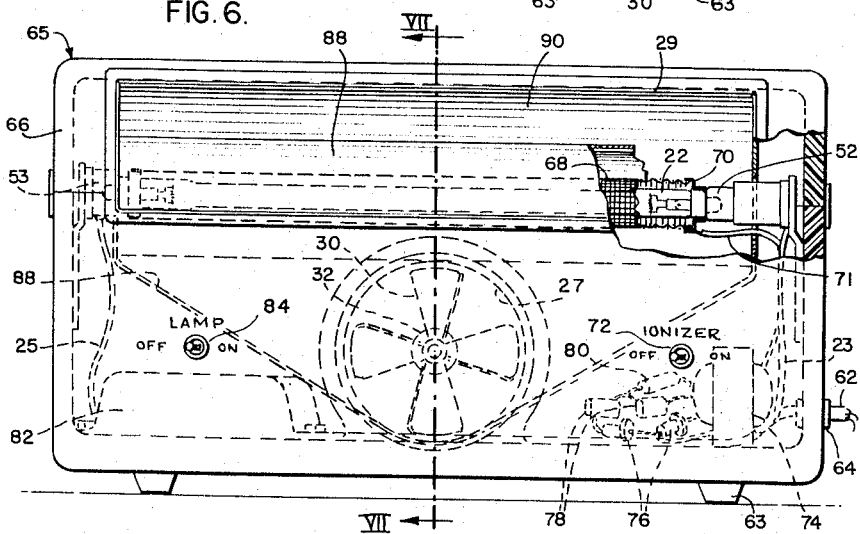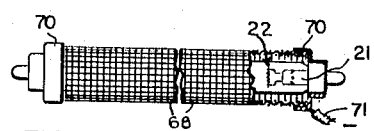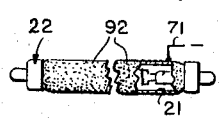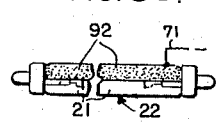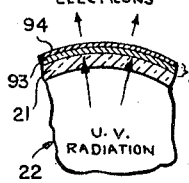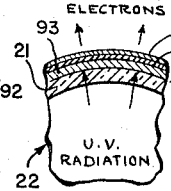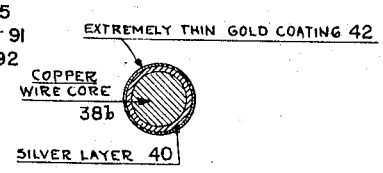

3,313,971
PHOTOSENSITIVE ELEMENT STABLE IN AIR
Rudolph Nagy, Upper Montclair, N.J., assignor to Westinghouse Electric Corporation, East Pittsburgh, Pa., a corporation of Pennsylvania
Original application Feb. 29, 1960, Ser. No. 11,709. Divided and this application May 14, 1962, Ser. No. 201,230
7 Claims. (Cl. 313—101)

This invention relates to air processing apparatus and, more particularly, to apparatus for simply and inexpensively generating negative ions in air to control the ion concentration of the atmosphere within an enclosed space and, if desired, concurrently purifying, deodorizing and disinfecting the air while it is being supplied with negative ions.

This application is a division of copending application Ser. No. 11,709, filed Feb. 29, 1960, and entitled "Air Processing Apparatus And Ion Generating Means And Component Therefor."

So-called electronic air purifying, disinfecting and deodorizing units are well known in the art as evidenced by U.S. Patents Nos. 2,702,862 and 2,855,641. Deodorization is achieved by means of an ozone-generating ultraviolet (UV) lamp whereas the removal of solid impurities from the air is accomplished by means of a filter or filters. Since ozone-generating UV lamps also emit bactericidal radiations in the 2537A region of the spectrum, the air that is circulated through such units is also irradiated by the UV radiations emanating from the lamp and is thus disinfected.

Published reports indicate that an atmosphere rich in negative ions has a beneficial physiological and therapeutic effect. For example, it has been reported that persons suffering from respiratory ailments such as asthma, sinusitis, hay fever and the like obtain relief when the air has a high negative ion count and the healing of burns, wounds and similar injuries appear to be promoted when exposed to such an atmosphere. Positive ions, on the other hand, are believed to have a depressing and irritating effect. While the manner in which the negative ions react with the body to achieve such beneficial results is not known at the present time, research in this field is being conducted with promising results.

There are various ways to produce negative ions in air. For example, they can and have been produced thermionically by means of a heated coil or filament of suitable material such as thoriated tungsten wire, electrostatically by means of a highly charged wire or the like and, in accordance with a more recent development, by irradiating the air with particles from a radioactive source. However, since these methods of ionization inherently generate other forms of energy, such as heat, and in some cases positive ions, they have not proven entirely satisfactory from either a practical or design standpoint for use in negative-ion generating apparatus. In addition, the total number of negative ions that can be produced by such means under practical and safe operating conditions is rather limited. Because of these and other limitations the aforesaid modes of ionization have not been widely adopted commercially for use in negative-ion generating apparatus capable of controlling the polarity of the atmosphere by increasing its negative ion count.

Negative ions may also be produced in air by another means, namely, photoelectrically by irradiating a photosensitive member or so-called photocathode with radiations of the proper wavelength. In this case the impinging radiations cause electrons to be emitted from the photosensitive member into the air where they become attached to gas molecules or dust particles and convert them into negative ions. Up to the present there has not been developed an air processing unit capable of efficiently and consistently generating large numbers of negative ions in air by means of the photoelectric effect primarily because there has not heretofore been available a photocathode that has a low work function and is stable in air and thus capable of remaining sufficiently photosensitive over a long period of time. Since ozone is a strong oxidizing agent, this problem of stability of the photosensitive member assumes even greater proportions in devices which are also designed to deodorize the air being processed, such as the aforementioned prior art units which contain ozone-generating UV lamps for example.

It is accordingly the general object of this invention to provide apparatus for efficiently and inexpensively generating large numbers of negative ions in air for extended periods of time.

Another and more specific object of this invention is the provision of a photosensitive material that has a low work function and is stable in air and even ozone and is therefore adapted for use in the aforementioned negative-ion generating apparatus.

The aforesaid objects, and others which will become apparent as the description proceeds, are achieved according to this invention by providing a composite photocathode that is stable in air and has a sufficiently low work function to enable it to emit large numbers of electrons when irradiated with radiant energy of a preselected wavelength, such as ultraviolet radiation for example. More specifically, the aforesaid photocathode is fabricated from photosensitive material that is stable in both air and ozone and said photocathode is preferably incorporated together with an ozone-generating UV lamp into apparatus for circulating air in such a manner that the air, in addition to being negatively ionized is also irradiated by the lamp and then discharged directly into the air before the generated negative ions are lost by recombination or otherwise neutralized within the unit. The UV lamp and photocathode can also be incorporated into existing air processing and circulating apparatus such as an air conditioner or a heating or cooling duct system for example, in which case the lamp and photocathode assembly is mounted inside the apparatus in such a position that the previously processed air is irradiated and supplied with negative ions just before it is discharged from the device.

A better understanding of the invention may be obtained by referring to the accompanying drawings wherein:

FIGURE 1 is a diagrammatic view of an air processing apparatus embodying the present invention;

FIGS. 2 and 3 are fragmentary cross-sectional views on an enlarged scale of two types of photocathodes adapted for use in the air processing units shown in the other figures;

FIG. 4 is a side sectional view of an air processing unit which embodies the "axial-flow" principle and other design features illustrated in FIG. 1;

FIG. 5 is a cross-sectional view along the line V—V of FIG. 4, in the direction of the arrows;

FIG. 6 is a front elevational view of another type of air processing unit according to this invention;

FIG. 7 is a cross-sectional view along the line VII—VII of FIG. 6, in the direction of the arrows;

FIG. 8 is a fragmentary elevational view of the UV lamp and the photosensitive screen assembly employed in the devices shown in FIGS. 6, 7.

FIGS. 8a and 8b are fragmentary views on a reduced scale of a modified form of lamp-and-photocathode assembly wherein the photosensitive member comprises a coating that covers all or half of the envelope of a tubular UV lamp, respectively, and thus constitutes an integral part thereof;

FIGS. 8c and 8d are fragmentary cross-sectional views on a greatly enlarged scale of the envelope of a UV lamp showing two types of composite photocathodes that have been coated directly onto the lamp envelope to provide lamps such as those shown in FIGS. 8a and 8b; and FIG. 9 is a cross-sectional view on a greatly enlarged scale of the photosensitive wire from which the screen photocathode enclosing the lamp in FIG. 8 is preferably fabricated.

While the photosensitive material of this invention may be combined with various kinds of radiant energy sources capable of emitting radiations of preselected wavelength, it will ordinarily be used with UV lamps and accordingly has been so illustrated and will be so described.

Turning now to the forms of the invention illustrated in the drawings, in FIG. 1 there is shown a diagrammatic representation of an axial-flow type of air processing unit 20 wherein an elongated tubular UV lamp 22 is centrally located within and extends axially of a cylindrically hollow air duct or casing 21. As indicated, the interior surface of the casing 21 is lined or coated with a suitable photoemissive material to provide a photocathode 26 thereat that is located in receptive proximity to the radiations emanating from the UV lamp 22 and is operable in response to the impinging UV radiations to emit electrons into the surrounding air and thereby convert gas molecules, dust particles, etc. therein into negatively charged ions. As is also indicated, the UV lamp 22 preferably but not necessarily produces both 1849A and 2537A radiations which, as is well known, generate ozone and kill bacteria, respectively, so that the air surrounding the lamp is not only supplied with large numbers of negative ions but is also deodorized and disinfected.

The photosensitive material from which the photocathode 26 is fabricated preferably has a work function that is low enough to enable it to respond to both of the aforesaid UV radiations. It is essential, however, that the photosensitive material be stable in air and, when an ozone-generating lamp is used, in ozone as well. Otherwise the composition and the work function of the surface layer of the photocathode 26 will change with time resulting in an undesirable fluctuation, and in most cases a decrease, in the number of negative ions produced. It has also been found necessary to ground and preferably connect the photocathode 26 to the negative terminal of a D.C. power supply as by a conductor 34 to prevent it from becoming positively charged through the loss of electrons and thus recapturing the electrons subsequently emitted and causing the negative ion production to gradually decrease with time.

The air duct or casing 21 has an intake opening 27 that is preferably, though not necessarily, covered by a filter 28 and is terminated at its opposite end by an outlet 29 that opens directly into the atmosphere. A suitable air circulating means such as fan 30 and motor 32 is provided at the intake opening 27 to enable contaminated air to be drawn into the unit 20, impelled through the casing 21 past the UV lamp 22 and photosensitive member 26, and out through the outlet 29, as shown by the arrows in FIG. 1. It should be noted that the filter 28 and the aforesaid fan and motor are located between the intake opening 27 and the lamp and photocathode assembly. This physical arrangement or sequence of components is an essential feature of the invention since experience has shown that if either the fan, motor, filter or any other obstruction having a large surface area is positioned rearwardly of the lamp 22 or photocathode 26 or over the outlet 29, the number of negative ions actually discharged into the atmosphere is drastically reduced indicating that most of them are being collected and neutralized by the filtering material or motor and fan assembly, etc. and thus lost. By arranging the aforesaid components in the above sequence contaminated air drawn into the air processing unit 20 is first purified by the filter 28, and then concurrently deodorized, disinfected and supplied with negative ions as it passes between the UV lamp 22 and photocathode 26, and the processed air finally discharged directly into the atmosphere, thereby not only refreshing the circulated air but controlling the concentration of negative ions therein.

In order for negative ion generating or air processing units of this character to be practical they must have a long useful life, be substantially maintenance-free, and be capable of reliably and efficiently generating large numbers of ions throughout their useful life. As will be appreciated, none of these requirements can be met if the photosensitive material and thus the photocathode 26 is unstable in air, and in ozone where an ozone-generating UV lamp is employed, or has too high a work function. While there are various metals such as aluminum and zinc that have work functions sufficiently low to enable them to emit large numbers of electrons under UV irradiation, they rapidly deteriorate in air and become coated with a layer of aluminum oxide and zinc oxide, respectively, which compounds, unfortunately, are relatively poor photoelectric emitters. For example, it has been found that when aluminum foil is irradiated by UV in air the number of negative ions that are produced drops to about one-half the original value in the first 25 hours of operation and to about one-third of the initial output in the first 65 hours of operation. This indicates that the work function of aluminum oxide is much higher than for aluminum. Adsorbed oxygen or nitrogen also reduces the work function of a metal surface. In fact, it has been reported that any electronegative element on the surface of a photocathode will form an electrical dipole with the negative side at the surface thereby repelling electrons back into the metal and preventing their escape. Metals that are inert and thus exhibit the desired chemical stability, such as gold and platinum for example, have work functions that are much too high so that these metals by themselves are inherently unsuitable for use as the photosensitive material is an ion generator of this type.

It has been discovered that the combination of chemical stability and low work function essential for a practical UV-activated ion generator can be very conveniently and inexpensively obtained by combining two or more selected materials to form a composite photocathode. Briefly stated, such composite photocathodes comprise a clean base metal having a thin layer of photoemissive material thereover that is stable in air and is more electropositive than the base metal. By combining the photoemissive material with a base metal that is less electropositive, the work function of the photoemissive coating is decreased thereby making it more efficient when used as the photocathode in a negative ion generator. While the reason for this reduction in work function is not clearly understood, it is theorized that since the photoemissive material is more electropositive than the base metal and thus has a greater affinity for electrons, it tends to lose its valency electrons to the base metal thereby forming an electric dipole, the positive side of which is at the exposed surface of the photocathode. Thus there is established a positive potential equal to the strength of the dipole that tends to pull electrons from the photoemissive material, thereby reducing its work function. Stated differently, the layer of electropositive ions formed at the surface of the photocathode appears to function in much the same manner as the grid of a thermionic tube. It has been reported that the electric field which such positive ions can create at the metal surface is very great, and under certain conditions may be in the order of $2.5 \times 10^6$ volts/cm.

It has also been reported that an increased photoelectric effect can be obtained by using an electronegative intermediate layer in the aforesaid combination. That is, if an electropositive photoemitter is deposited on a highly electronegative element, such as oxygen, which in turn is carried by a substrate that is less electropositive than the photoemitter, then the photoemissivity of the latter will be greatly increased. A possible explanation for this phenomenon is that a stronger dipole is produced resulting in an even greater electric field and a proportionately lower work function. Composite photocathodes of this type have been used in the phototube art, a typical example being Ag-O-Cs which has a very high photoemission in a vacuum. However, insofar as cesium is very unstable in air this particular combination of materials would obviously be unsuitable for use in an air processing unit. This principle can, nonetheless, be employed to provide composite stable photocathodes which are suitable. For example, there are many stable semiconductors that are photoemissive, such as SnO, $SnO_2$, CuO, $Cu_2O$, PbS, PbSe, $Cu_2S$ and Sb. It has been reported that if the semiconductor is placed on a metal substrate that has a higher work function than the semiconductor, there will be an increase in the photoemissivity of the semiconductor. Thus, if a layer of the semiconductor about 200 to 500 A. thick is evaporated onto any of the heavier metals, a dipole will be produced which has the effect of facilitating the escape of photoelectrons and thereby reducing the work function of the semiconductor.

Whatever the reason for the reduction in work function exhibited by the foregoing combinations of materials, the fact is that stable photoemissive materials which, by themselves, have work functions too high to permit them to efficiently generate the required large numbers of negative ions are rendered more photoemissive and thus suitable for use in air processing units. The photosensitive components employed in the units hereinafter described, accordingly, comprise composite photocathodes of the type illustrated either in FIG. 2 or FIG. 3. As shown in FIG. 2, if the photoemissive material 36 itself is stable in air (and ozone) it is simply coated onto a base metal 38a that is less electropositive thereby providing a two-element composite photocathode 26a. Alternatively, if the photoemissive material is not stable in air (or ozone), then a layer 40 thereof is first deposited onto the less-electropositive base metal 38b and then coated with a thin layer 42 of stable material, such as gold or the like, that is permeable to both UV radiation and electrons thereby providing a protective outer coating and a triple-element photocathode 26b as shown in FIG. 3. If the photoemissive layer 36 or 40 is a semiconductor then the photocathodes 26a and 26b will, in accordance with the foregoing discussion in connection with an intermediate layer of electronegative material, in reality be three and four-element photocathodes, respectively.

It will be obvious, of course, that the intermediate electronegative layer can also be oxygen associated with the surface of the base member in which case the oxygen can be present in the form of an oxide coating on the base member.

Following are some specific examples of various combinations of selected materials suited for use in fabricating the aforementioned composite photocathodes 26a and 26b, together with the numbers of negative ions typically generated thereby under UV irradiation from the type of lamps indicated under similar operating conditions, i.e., location of the lamp, velocity of the air, etc.

TABLE I

| Base Member | Stable Photoelectric Material | Unstable Photoelectric Material | Stable Protective Coating | Thousands of Negative Ions Produced/ml. (with Photocathode Grounded or Negatively Charged as indicated) | | | | |
|---|---|---|---|---|---|---|---|---|
| | | | | Grounded | 130 v. | 250 v. | 420 v. | 900 v. |
| Cu (screen) | | Ag | Au | ¹52 | ¹285 | | ¹285 | ¹182 |
| CuO (screen) | | Ag | Au | ¹0.26 | ¹52 | | ¹210 | ¹156 |
| Glass (plate) | $SnO^2$ | | | ¹13 | | | | |
| Cu (screen) | CuO | | | ¹52 | | | ¹78 | |
| Ag (screen) | AgS | | | ²21-53 | | ²100-130 | | |
| Pb (plate) | PbS | | | ²65 | | | ²104 | |
| Cu (screen) | | Zn | Au | | ²52 | | | |
| | | Al (plate) | Au | ¹1.8 | ¹32.5 | ¹41.6 | ¹41.6 | |

¹ One G10T 5½H germicidal UV lamp sold by the Westinghouse Elec. Corp.
² Two 794H S11 ozone-generating lamps sold by the Westinghouse Elec. Corp.

As can be seen from Table 1, by properly combining selected materials it is possible to obtain photocathodes that will have a low threshold voltage and thus a high photoemissivity and yet be stable enough to remain photosensitive for long periods of time in air and thus able to reliably generate the desired number of negative ions. A Cu-Ag-Au photocathode has given excellent results on both counts and is accordingly preferred. In addition, and of equal importance, the composite photocathodes can be very conveniently and inexpensively fabricated. For example, the preferred Cu-Ag-Au photocathode can be fabricated by dipping a copper sheet or screen in dilute nitric acid and then water to remove any oxide. The cleansed metal is then immediately placed into a silver cyanide bath and electroplated using silver as the other electrode. When the copper color is no longer visible the silver-coated copper is then withdrawn and placed into a gold cyanide bath and electroplated until the silver color has just disappeared. It has been found that when this procedure is used the layer of silver that is deposited will be sufficiently photosensitive whereas the layer of gold will be sufficiently thin to permit the UV radiations to penetrate through to the silver layer and the photoelectrons to pass through to the atmosphere, but will still be thick enough to provide the desired protection from corrosive effects of the atmosphere. The permissible thickness of the protective layer will vary depending upon the particular material employed by preferably it should not be greater than about 100 atom layers thick since with greater thicknesses the absorption of UV becomes excessive.

In addition to those listed, zinc, aluminum, iron, lead and gold may also be used as the base metal. Aluminum foil would make an excellent photocathode if it weren't for the fact that it deteriorates rapidly in air and especially ozone. However, this problem can be solved by coating the aluminum with a protective coating such as a thin UV-and-electron-transmitting film of suitable inert material such as gold (as indicated in Table 1 above) or with silicon monoxide or titanium monoxide or the like.

It has also been found that the number of negative ions produced varies somewhat with the thickness of the layer of photoemissive material. However, this is not too critical and satisfactory results have been obtained by maintaining the thickness of the silver layer, in the case of the aforementioned Cu-Ag-Au photocathode for example, between 50 and 300 atom layers.

The number of negative ions actually introduced into the atmosphere depends also upon the wattage of the UV lamp 22, the ratio of 1849A to 2537A radiation it emits, the rate of flow of the air through the unit, the type of photocathode, the design and air flow characteristics of the unit, and the magnitude of the negative potential applied to the photocathode. A high rate of flow will blow most of the ions out of the unit before they are neutralized and will thus result in the largest number of "free" or usable ions. Care must be taken, however, not to create excessive air turbulance inside the unit and to avoid placing any large obstacle near or over the outlet, such as the fan or even a plastic grill having very small openings, since this will remove many of the ions from the air stream. A rate of flow of from 40 to 100 c.f.m. and a negative potential within the range of about 150 to 500 volts have given very satisfactory results.

With specific reference now to FIGS. 4 and 5, there is shown an air processing unit 44 embodying the axial-flow principle illustrated in FIG. 1. The unit 44 consists of two annular cowlings 46 and 47 that are joined together by an outer cylinder 48 and an inner cylinder 50 thereby forming a double-walled casing that defines a cylindrical air passageway. The cowling 46 is provided with an annular sleeve 54 that defines the outlet 29 of the unit 44 and has three radially extending spokes 56 (shown more particularly in FIG. 5), which support a lamp socket 52 centrally within the air passageway. Similarly, the cowling 47 is provided with a sleeve 58 which defines the intake opening 27 and has radial spokes 59 that support a second lamp socket 53 as well as an air circulating means such as a motor 32 and a fan 30 centrally within the air passageway. The intake opening 27 is desirably covered by a suitable filter 28 adapted to remove solid impurities from the contaminated air drawn into the unit. An ozone-generating UV lamp 22 of elongated tubular configuration is mounted in the sockets 52 and 53 and extends coaxially of the inner cylinder 50, the inner surface whereof carries a stable composite photocathode 26 of the type discussed above.

Preferably, the inner cylinder 50 is fabricated from electrically-conductive material such as copper and constitutes the base metal for the photocathode 26 which thus forms part of the inner wall of the unit 44 that defines the air passageway. The cowlings 46 and 47 are preferably made of plastic and are provided with legs 63 to enable the unit 44 to be carried about and set down on a table or the like. Recessed within the space between the outer cylinder 48 and inner cylinder 50 is a compact lamp-ballasting and voltage-converting circuit 60 that is connected, as shown more particularly in FIG. 4, by conductors 23 and 25 to the lamp sockets 52 and 53, to the inner cylinder 50 by a conductor strap 61 and to the motor 32 by a conductor 33. The aforesaid circuit is adapted to be connected to an A.C. convenience outlet by means of a power cord 62 that passes through a grommeted opening 64 in the bottom of the outer cylinder 48.

In FIGS. 6 and 7 there is shown another type of air processing unit 65 comprising an elongated housing 66 of generally rectangular cross-section that is preferably fabricated from plastic or the like. Located within and extending longitudinally of the upper section of the housing 66 is a tubular elongated UV lamp 22 that is mounted in a pair of sockets 52 and 53 secured to the sides of the housing. As shown more particularly in FIG. 8, the lamp 22 according to this embodiment is enclosed by a foraminous or screen grid type photocathode 68 of cylindrical configuration that is fabricated from photosensitive wire, such as copper wire that is coated with silver and then gold for example, as illustrated in FIG. 9. The screen photocathode 68 is held in spaced relationship with respect to the lamp 22 by ring holders 70 attached to each of the lamp bases. The screen photocathode 68 as shown in FIG. 6 is connected by means of the ring holders 70, a conductor 71 and an "ON-OFF" switch 72 mounted on the front of the housing 66 to a transformer 74 and a network of rectifiers 76, capacitors 78 and a resistor 80 connected to operate as voltage-rectifier and multiplier circuit as hereinafter described. The aforesaid circuit is, in turn, connected to an A.C.-outlet by a power cord 62 that passes through a grommeted opening 64 in the side of the housing. The UV lamp 22 is connected to a ballast 82 by conductors 23 and 25 through a second "ON-OFF" switch 84 mounted on the front of the housing, the other end of said ballast being connected to one side of the supply line through the power cord 62.

As shown in FIGS. 6 and 7, the back of the housing 66 is provided with a circular intake opening 27 that is centrally located at the lower edge of the unit and is covered by a suitable filter 28. A fan 30 and motor 32 are mounted within the lower section of the housing 66 adjacent to and in alignment with the aforesaid intake opening and filter. Extending upwardly from the bottom of the housing 66 and the fan 30 is a first baffle 88 that is arcuate and extends up past and then curves back toward the lamp 22 terminating proximate the grid photocathode 68. As shown in FIG. 6, the baffle 88 is divergent upwardly and at its wide end is at least as long as the UV lamp 22. Thus, contaminated air drawn through the filtered intake opening 27 is funnelled by the baffle 88 upwardly to the front of the lamp-and-screen assembly and thence, by means of a second baffle 90, around the underside, back and top of the aforesaid assembly to a slot outlet 29 in the front of the housing 66, which outlet and baffle 90 extend the entire length of the lamp almost completely across the housing.

By virtue of the curved retroverted configuration of the first baffle 88 and the helical configuration of the second baffle 90, the inner ends whereof overlie but are spaced from each other, the contaminated air is conveyed from the intake opening 27 along a tortuous path past the lamp 22 and screen photocathode 68 in a direction transverse to the longitudinal axis of the lamp, and thence directly to the atmosphere through the outlet 29. The housing 66 can be provided with legs 63 to permit the unit 65 to be set down at a convenient location or, as shown by the dotted lines in FIG. 7, can be permanently affixed to a wall 73 or the like by means of a bracket 69 and a spacer 67. If desired, the flow of processed air from the unit may be controlled by widely spaced louvers 86 over the outlet 29, which louvers are shown in dotted outline in FIG. 7.

As shown in FIGS. 8a and 8b, instead of the photocathode 68 comprising a cylindrical screen grid that is mounted over the lamp 22, the photocathode can comprise a composite coating 92 that is deposited directly on the lamp envelope 21 and covers all or only half of its surface, respectively. In this case, the photocathode would comprise an integral part of the lamp 22. It will be obvious, of course, that unless the coating 92 is sufficiently thin to be UV-transmissive, a lamp 22 such as that shown in FIG. 8a, will only operate as a negative ion generator and will not deodorize or disinfect the air since the entire lamp envelope is coated and the required UV radiations would not be able to pass therethrough.

As shown in FIG. 8c, the coating 92 comprises a base layer 93 that is UV-transmissive and a layer 94 of stable photoemissive material that is more electropositive than the base layer and sufficiently thin to be permeable to electrons. Thus, the UV radiations generated within the lamp 22 will pass through the enevolpe 21 and base layer 93 and excite the photoelectric outer layer 94 causing electrons to be emitted into the atmosphere.

If a layer 91 of the unstable photoemissive material is used then a protective coating 95 of gold or the like is applied thereover, as shown in FIG. 8d, which coating is sufficiently thin to permit the passage of electrons.

It will be recognized from the foregoing that the objects of the invention have been achieved by providing a stable photosensitive member and an ion-generating unit capable, by virtue of the stablility and low work function of the photosensitive member, of inexpensively and reliably generating large numbers of negative ions and introducing them into an enclosed atmosphere before they are lost by neutralization, recombination, etc.

While several embodiments of the present invention have been illustrated and described in detail, it is to be understood that various modifications in the construction and organization of the parts thereof can be made without departing from the spirit and scope of the invention.

I claim:

1. A photocathode adapted for use in apparatus for generating negative ions in air by the photoelectric effect comprising a base member, a layer of photoemissive material on said base member that is responsive to radiation of preselected wavelength and more electropositive than said base member but unstable in air, and a thin coating of another material over said photoemissive material that is stable in air and permeable to both electrons and the aforesaid radiation and adapted thereby to serve as a protective coating for said unstable photoemissive material.

2. A photocathode adapted for use in apparatus for generating negative ions in air by the photoelectric effect comprising an electrically-conductive base member, a first layer of electronegative material on said base member, a second layer of photoemissive material on said electronegative material, said photoemissive material being responsive to radiation of a preselected wavelength and more electropositive than said base member but unstable in air, and a third layer of another material over said photoemissive material that is stable in air and permeable to both electrons and the aforesaid radiation and adapted thereby to serve as a protective coating for said unstable photoemissive material.

3. A photocathode for air-processing apparatus comprising a copper base member, a layer of silver over said copper base member, and a thin layer of gold over said layer of silver that is permeable to both ultraviolet radiation and electrons.

4. The photocathode set forth in claim 3 wherein said copper base member comprises a wire screen.

5. A photocathode for air-processing apparatus consisting of an aluminum member coated with a thin layer of material that is stable in air and permeable to both electrons and ultraviolet radiation and is selected from the group consisting of gold, silicon monoxide and titanium monoxide.

6. A photocathode comprising, a metal substrate, an electronegative material covering said metal substrate, and a layer photoemissive material on said electronegative material that is more electropositive than said metal substrate and is chemically stable in air, said layer of photoemissive material having a work function such that it is responsive to ultraviolet radiation and is thereby adapted to emit electrons when exposed to the atmosphere and such radiation.

7. A photocathode for processing a stream of air comprising, in combination, a wire screen fabricated from a preselected metal, and a layer of photoemissive material on said wire screen that is more electropositive than the metal from which the screen is formed, said layer of photoemissive material being chemically stable in air and having a work function such that it is responsive to ultraviolet radiation and is thereby adapted to emit electrons into the surrounding air when exposed to such radiation and said air stream.

References Cited by the Examiner

UNITED STATES PATENTS

| | | | |
|---|---|---|---|
| 1,831,314 | 11/1931 | Master et al. | 313—100 X |
| 1,965,849 | 7/1934 | McIlvaine | 313—100 |
| 2,049,472 | 8/1936 | Rosett | 136—89.21 |
| 2,079,477 | 5/1937 | Asao et al. | 313—102 |
| 2,217,205 | 10/1940 | Prescott | 313—100 |
| 2,237,006 | 4/1941 | Koller | 117—230 X |
| 2,429,933 | 10/1947 | Gibson | 178—7.2 |
| 2,739,084 | 3/1956 | Sommer | 313—94 X |
| 2,890,359 | 6/1959 | Heijne et al. | 313—102 X |
| 2,898,498 | 8/1959 | Philipp | 313—101 |
| 3,047,718 | 7/1962 | Fleming et al. | 250—43 |
| 3,072,978 | 1/1963 | Minto | 21—74 |

JAMES W. LAWRENCE, *Primary Examiner.*

R. SEGAL, G. N. WESTBY, *Assistant Examiners.*